(12) United States Patent
Miura et al.

(10) Patent No.: US 9,718,430 B2
(45) Date of Patent: Aug. 1, 2017

(54) AIRBAG DEVICE

(71) Applicant: TOYODA GOSEI CO., LTD., Kiyosu-shi, Aichi-ken (JP)

(72) Inventors: Wataru Miura, Kiyosu (JP); Ryuji Masudome, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 2 days.

(21) Appl. No.: 15/047,093

(22) Filed: Feb. 18, 2016

(65) Prior Publication Data

US 2016/0257277 A1     Sep. 8, 2016

(30) Foreign Application Priority Data

Mar. 6, 2015  (JP) ................................. 2015-044947

(51) Int. Cl.
*B60R 21/217*   (2011.01)
*B60R 21/215*   (2011.01)

(52) U.S. Cl.
CPC .......... *B60R 21/217* (2013.01); *B60R 21/215* (2013.01); *B60R 2021/2177* (2013.01)

(58) Field of Classification Search
CPC ................ B60R 21/215; B60R 21/217; B60R 2021/2177
See application file for complete search history.

(56) References Cited

U.S. PATENT DOCUMENTS

| 5,732,971 | A | * | 3/1998 | Lutz | ..................... B60R 21/2171 280/728.2 |
| 5,876,058 | A | * | 3/1999 | Nemoto | .............. B60R 21/2171 280/728.2 |
| 6,170,857 | B1 | * | 1/2001 | Okada | ................. B60R 21/2346 280/728.1 |
| 6,299,202 | B1 | * | 10/2001 | Okada | ................... B60R 21/233 280/732 |
| 7,850,196 | B2 | * | 12/2010 | Kashiwagi | .......... B60R 21/2171 280/728.1 |

(Continued)

FOREIGN PATENT DOCUMENTS

| DE | 19830227 A1 * | 1/2000 | ......... B60R 16/0239 |
| JP | 2004050932 A * | 2/2004 | ............. B60R 21/22 |

(Continued)

*Primary Examiner* — Barry Gooden, Jr.
(74) *Attorney, Agent, or Firm* — Posz Law Group, PLC

(57) ABSTRACT

An airbag device includes: a case configured to receive an airbag that is folded, configured to enable the airbag under inflation to protrude from an upper opening, and including a bottom wall portion and a side wall portion that rises in a substantially tubular shape from a peripheral edge of the bottom wall portion; and a coupling member surrounding the case and coupled to the case by a fixing member, wherein: the case is formed to retain a rising shape of the side wall portion from the bottom wall portion by performing a bending process on a sheet metal material; and the joining piece portion and the joined portion include through-holes, and are coupled to each other and are coupled to the coupling member using the fixing member penetrating through-holes in a state in which the joining piece portion and the joined portion are superimposed on each other.

2 Claims, 12 Drawing Sheets

(56) References Cited

U.S. PATENT DOCUMENTS

| | | | | |
|---|---|---|---|---|
| 8,297,650 | B2* | 10/2012 | Enders | B60R 21/206 280/730.1 |
| 8,491,006 | B2* | 7/2013 | Nagai | B60R 21/205 280/739 |
| 2002/0079675 | A1* | 6/2002 | Taoka | B60R 21/201 280/728.2 |
| 2004/0100071 | A1* | 5/2004 | Chavez | B60R 21/2171 280/728.2 |
| 2004/0217579 | A1* | 11/2004 | Dannenhauer | B60R 21/2171 280/728.3 |
| 2006/0061073 | A1* | 3/2006 | Naruse | B60R 21/21 280/730.2 |
| 2007/0007752 | A1* | 1/2007 | Rose | B60R 21/217 280/728.2 |
| 2007/0007753 | A1* | 1/2007 | Williams | B60R 21/217 280/728.2 |
| 2007/0057498 | A1* | 3/2007 | Koh | B60R 21/205 280/743.1 |
| 2007/0176398 | A1* | 8/2007 | Vigeant | B60R 21/2171 280/728.2 |
| 2011/0109068 | A1* | 5/2011 | Fukagawa | B60R 21/217 280/732 |
| 2012/0049497 | A1* | 3/2012 | Enders | B60R 21/206 280/743.1 |
| 2016/0257275 | A1* | 9/2016 | Miura | B60R 21/217 |

FOREIGN PATENT DOCUMENTS

| | | | | |
|---|---|---|---|---|
| JP | 2010-137841 A | 6/2010 | | |
| JP | 2011-057165 A | 3/2011 | | |
| JP | 2013-018387 A | 1/2013 | | |
| WO | WO 2007005092 A2 * | 1/2007 | | B60R 21/217 |

* cited by examiner

A.

B.

A.

B.

AIRBAG DEVICE

CROSS-REFERENCE TO RELATED APPLICATION(S)

This application is based upon and claims the benefit of priority from Japanese Patent Application No. 2015-044947, filed on Mar. 6, 2015, the entire contents of which are incorporated herein by reference.

BACKGROUND

1. Field of the Invention

The present invention relates to an airbag device including a case that receives a folded airbag, enables the airbag under inflation to protrude from an upper opening, has a substantially box shape having a bottom wall portion and a side wall portion rising in a substantially tubular shape from a peripheral edge of the bottom wall portion, and is coupled to a surrounding coupling member using a fixing member.

2. Description of the Related Art

In the related art, a case used for an airbag device is known which is formed by bending a sheet metal material such that side wall components constituting a side wall portion rise from a peripheral edge of a bottom wall component constituting a bottom wall portion in the sheet metal material. The case according to the related art includes a fitting piece portion that couples the side wall components to each other by welding to form a substantially tubular shape and is coupled to an airbag cover as a surrounding coupling member (for example, JP-A-2013-18387).

However, the case according to the related art is formed by bending a sheet metal material, but since the side wall components constituting the side wall portion are coupled to each other by welding, the configuration is not simple. When the airbag cover is fitted to the formed case in a state in which a folded airbag is received therein after the case is manufactured, a coupling operation of coupling a fitting piece portion to the airbag cover using a fixing member is additionally required and there is room for improvement in a decrease in the number of manufacturing steps.

SUMMARY

The present invention is made to solve the above-mentioned problem and an object thereof is to provide an airbag device which can suppress an increase in manufacturing cost and can be manufactured simply.

According to an aspect of the present invention, there is provided an airbag device including: a case configured to receive an airbag that is folded, and configured to enable the airbag under inflation to protrude from an upper opening, the case having a substantially box shape, and including a bottom wall portion and a side wall portion that rises in a substantially tubular shape from a peripheral edge of the bottom wall portion; a fixing member; and a coupling member surrounding the case and coupled to the case by the fixing member, wherein: the case is formed to retain a rising shape of the side wall portion from the bottom wall portion by performing a bending process on a sheet metal material such that side wall components constituting the side wall portion rise from a peripheral edge of a bottom wall component constituting the bottom wall portion in the sheet metal material and superimposing and coupling a joining piece portion formed in each side wall component on and to a corresponding joined portion; and the joining piece portion in the case and the joined portion corresponding to the joining piece portion include through-holes which are penetrated by the fixing member, respectively, and are coupled to each other and are coupled to the coupling member using the fixing member penetrating through-holes of the joining piece portion and the joined portion in a state in which the joining piece portion and the joined portion are superimposed on each other.

In the airbag device according to the present invention, the joining piece portion formed in each side wall component of the case and the joined portion are coupled to each other using the fixing member for coupling the case to the surrounding coupling member, and the case retains the rising shape of the side wall portion from the bottom wall portion by coupling the joining piece portion and the joined portion using the fixing member. That is, in the airbag device according to the present invention, since the rising shape of the side wall portion from the bottom wall portion can be retained and the case can be coupled to the coupling member using the fixing member for coupling to the coupling member, it is possible to further easily perform formation of the case and coupling of the case to the coupling member in comparison with the airbag device according to the related art.

As a result, according to the present invention, it is possible to suppress an increase in manufacturing cost and to simply manufacture the airbag device.

In the airbag device according to the present invention, the coupling member may be an airbag cover including a door portion that covers the opening and is pressed and unfolded by the airbag in unfolding the folded airbag. In this case, in assembling the airbag device, the case can be formed when the airbag cover is coupled to the case. Accordingly, it is possible to simplify a process of assembling the airbag device, which is desirable.

Specifically, in the airbag device having the above-mentioned configuration, plural side wall components of the case may be disposed from the peripheral edge of the bottom wall component, and the joined portion may be formed as the joining piece portion formed in each side wall component.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment of the present invention will be described with reference to the accompanying drawings. In the embodiment, an airbag device for a front passenger seat M (hereinafter, abbreviated to an "airbag device") will be exemplified. In the embodiment, it is assumed that upper, lower, front, and rear sides correspond to front, rear, upper, lower, right and left sides of a vehicle when the airbag device M is mounted on a vehicle, unless particularly mentioned.

Figure 1:
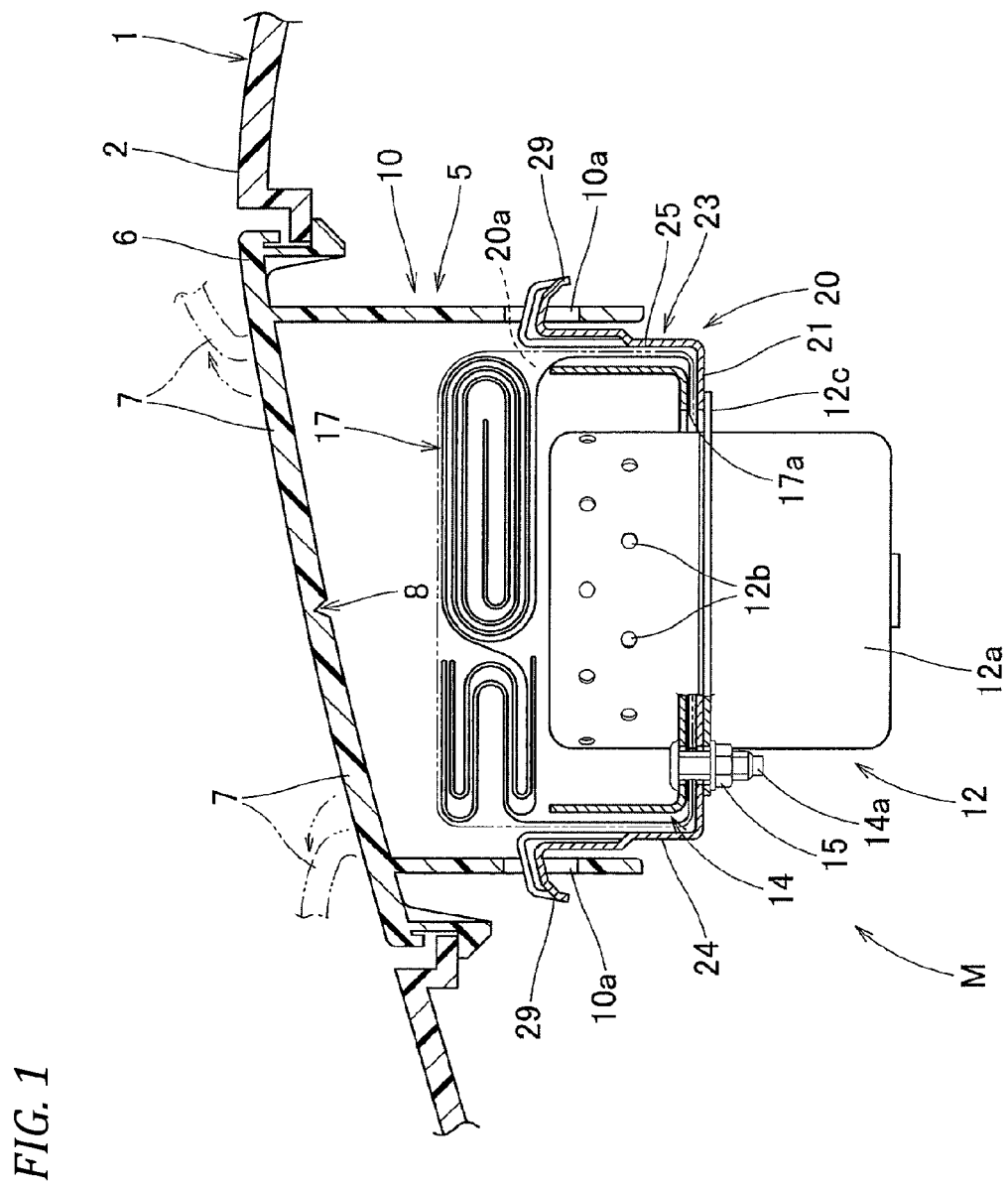
FIG. 1 is a longitudinal cross-sectional view schematically illustrating an airbag device for a front passenger seat according to an embodiment of the present invention when viewed in a front-rear direction.
Figure 2:
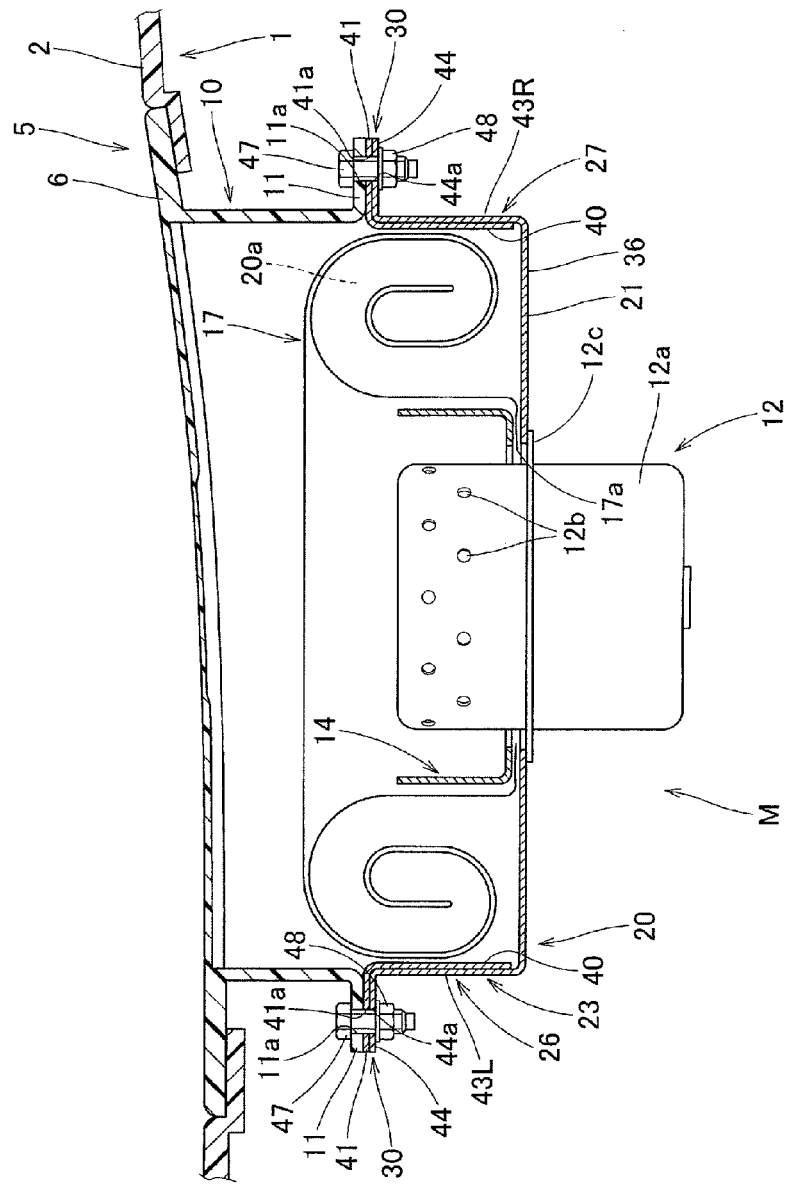
FIG. 2 is a longitudinal cross-sectional view schematically illustrating the airbag device for a front passenger seat illustrated in FIG. 1 when viewed in a right-left direction.

As illustrated in FIGS. 1 and 2, the airbag device M is disposed inside a top surface 2 of an instrument panel 1 in the front of a front passenger seat in a vehicle. The airbag device M includes a folded airbag 17, an inflator 12 that supplies inflating gas to the airbag 17, a case 20 that receives and supports the airbag 17 and the inflator 12, a retainer 14 that fits the airbag 17 and the inflator 12 to the case 20, and an airbag cover 5 that covers the folded airbag 17.

In this embodiment, the airbag cover 5 constitutes a coupling member that is coupled to the case 20, is formed as a body formed of a synthetic resin and separated from the instrument panel 1, and is disposed in a part of an opening of the instrument panel 1. The airbag cover 5 is formed of a synthetic resin such as polyolefin-based thermoplastic elastomer and includes a ceiling wall portion 6 covering an opening 20a to be described later of the case 20 and a peripheral wall portion 10 extending downward from the peripheral edge of the ceiling wall portion 6 and having a substantially rectangular tubular shape.

In the ceiling wall portion 6, two door portions 7 and 7 that are pressed and unfolded in unfolding and inflating the airbag 17 are disposed in an area surrounded with the peripheral wall portion 10. The door portions 7 and 7 are disposed in parallel in the front-rear direction, have break-scheduled portions 8 having a substantially H shape in a top view arranged in the vicinity thereof, and are pressed by the inflating airbag 17 to break the break-scheduled portions 8 and are opened forward and backward by breaking when the airbag 17 is unfolded and inflated.

The peripheral wall portion 10 is disposed to cover the outer periphery of the side wall portion 23 of the case 20, and a locking hole portion 10a that can lock a locking claw portion 29 to be described later of the case 20 at the peripheral edge thereof is formed in a part covering the front side of the side wall portion 23 and a part covering the rear side thereof. In the peripheral wall portion 10, a fitting piece 11 is formed to protrude outward at the front end and the rear end of a part covering the left side of the side wall portion 23 and a part covering the right side thereof. The fitting piece 11 serves to couple a fitting piece portion 30 to be described later of the case 20, and a through-hole 11a which is penetrated by a bolt 47 as a fixing member is formed in each fitting piece 11.

As illustrated in FIGS. 1 and 2, the inflator 12 includes a body portion 12a having plural gas discharge ports 12b and having a substantially cylindrical shape and a flange portion 12c which is used to fit the inflator 12 to the case 20.

The airbag 17 is formed in a bag shape having plasticity which can be inflated by allowing the inflating gas to flow therein, is folded and received in the case 20, and is configured to protect an occupant sitting on the passenger seat when the airbag is completely inflated. A gas inlet 17a which is opened in a substantially circular shape so as to allow the inflating gas to flow therein and of which the peripheral edge is attached to a bottom wall portion 21 of the case 20 is formed in the airbag 17.

Figure 3:
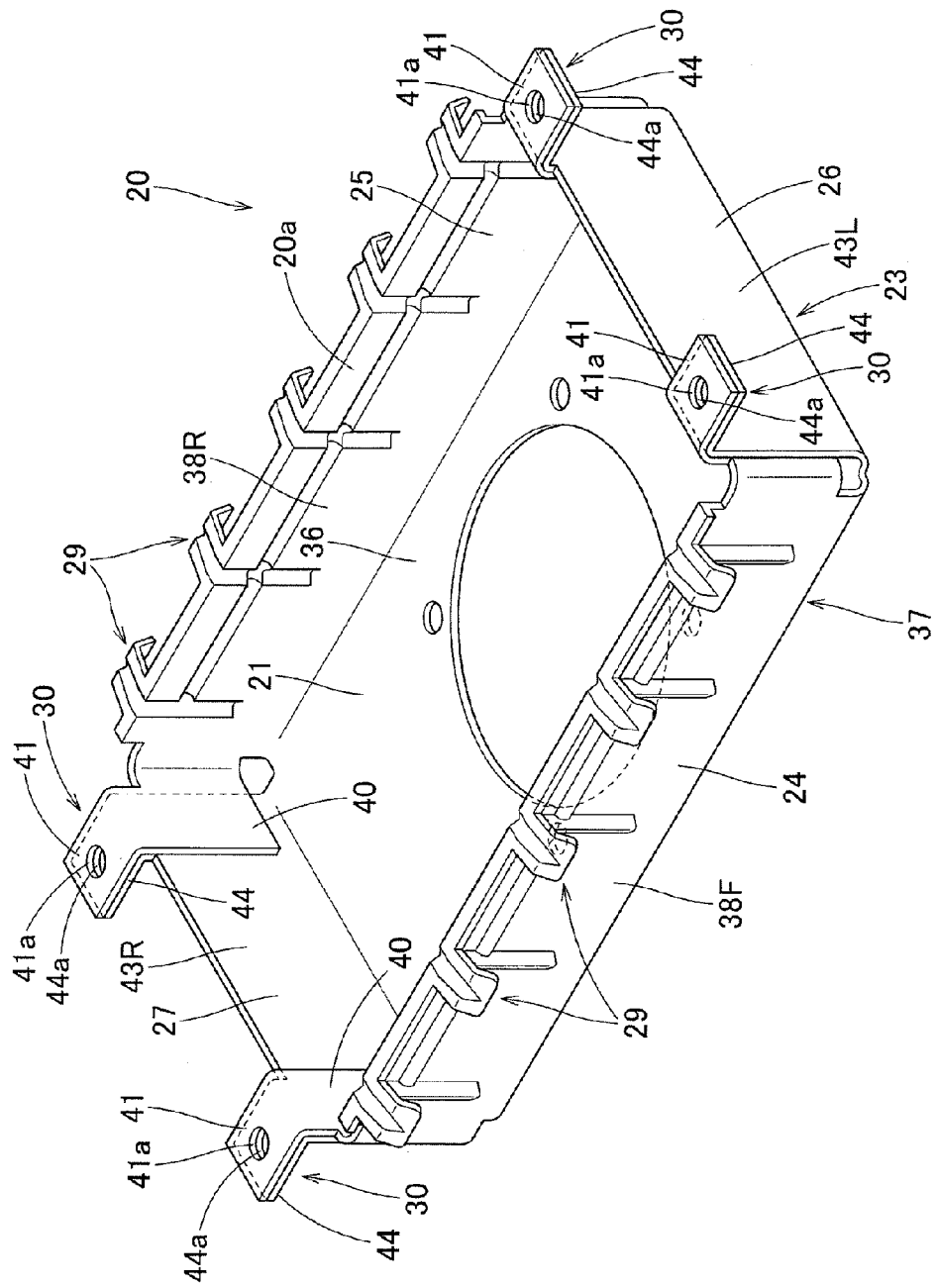
FIG. 3 is a schematic perspective view of a case which is used in the airbag device for a front passenger seat according to the embodiment.

The case 20 is formed of a sheet metal material, receives the folded airbag 17, enables the airbag 17 under inflation to protrude from an upper opening 20a, and is formed in a substantially box shape including a bottom wall portion 21 and a side wall portion 23 rising in a substantially tubular shape from the peripheral edge of the bottom wall portion 21 as illustrated in FIGS. 1 to 3. The case 20 according to this embodiment is coupled to the airbag cover 5 as a peripheral coupling member using a bolt 47 as a fixing member.

In this embodiment, the bottom wall portion 21 has a substantially rectangular plate shape in which the width in the right-left direction is larger, an insertion hole (of which a reference numeral is omitted) into which the body portion 12a of the inflator 12 can be inserted is disposed at the center thereof, and a fitting hole (of which a reference numeral is omitted) into which a bolt 14a of the retainer 14 can be inserted is disposed around the insertion hole. In this embodiment, the airbag 17 and the inflator 12 are fitted to the bottom wall portion 21 of the case 20 by penetrating the peripheral edge of the gas inlet 17a in the airbag 17 with the bolts 14a of the retainer 14 disposed in the airbag 17, inserting the bolts into the fitting holes of the bottom wall portion 21 of the case 20, penetrating the flange portion 12c of the inflator 12 with the bolts, and fixing the bolts with nuts 15.

At upper ends of a front wall portion 24 and a rear wall portion 25 disposed to face each other in the front-rear direction in the side wall portion 23, plural locking claw portions 29 for locking the peripheral wall portion 10 of the airbag cover 5 are formed in the right-left direction to protrude outward. The locking claw portions 29 are formed integrally with the case 20 and are configured to be inserted into locking hole portions 10a formed in the peripheral wall portion 10 and to be locked to the peripheral edges of the locking hole portions 10a as illustrated in FIG. 1. At front and rear ends (in the vicinity of four corners at the upper end of the side wall portion 23) of the upper ends of a left wall portion 26 and a right wall portion 27 disposed to face each other in the right-left direction in the side wall portion 23, fitting piece portions 30 extending outward to the right and left sides are formed to protrude. The fitting piece portions 30 are configured by vertically superimposing protruding portions 41 (joining piece portions) extending from a front wall component 38F and a rear wall component 38R to be described later and protruding piece portions 44 (joined piece portions) extending from a left wall component 43L and a right wall component 43R on each other and are coupled to fitting pieces 11 formed in the airbag cover 5 as the coupling member using the bolts 47 and the nuts 48 as the fixing members in a state in which the fitting pieces 11 are superimposed thereon from the upper side (see FIG. 3). In the embodiment, the side wall portion 23 is formed in a substantially rectangular tubular shape in which the front wall component 38F constituting a front wall portion 24, the rear wall component 38R constituting a rear wall portion 25, the left wall component 43L constituting a left wall portion 26, and the right wall component 43R constituting a right wall portion 27 are coupled to each other by coupling the fitting piece portions 30 disposed in the vicinity of four corners at the upper end of the side wall portion 23 to the fitting pieces 11 of the airbag cover 5.

Figure 4:
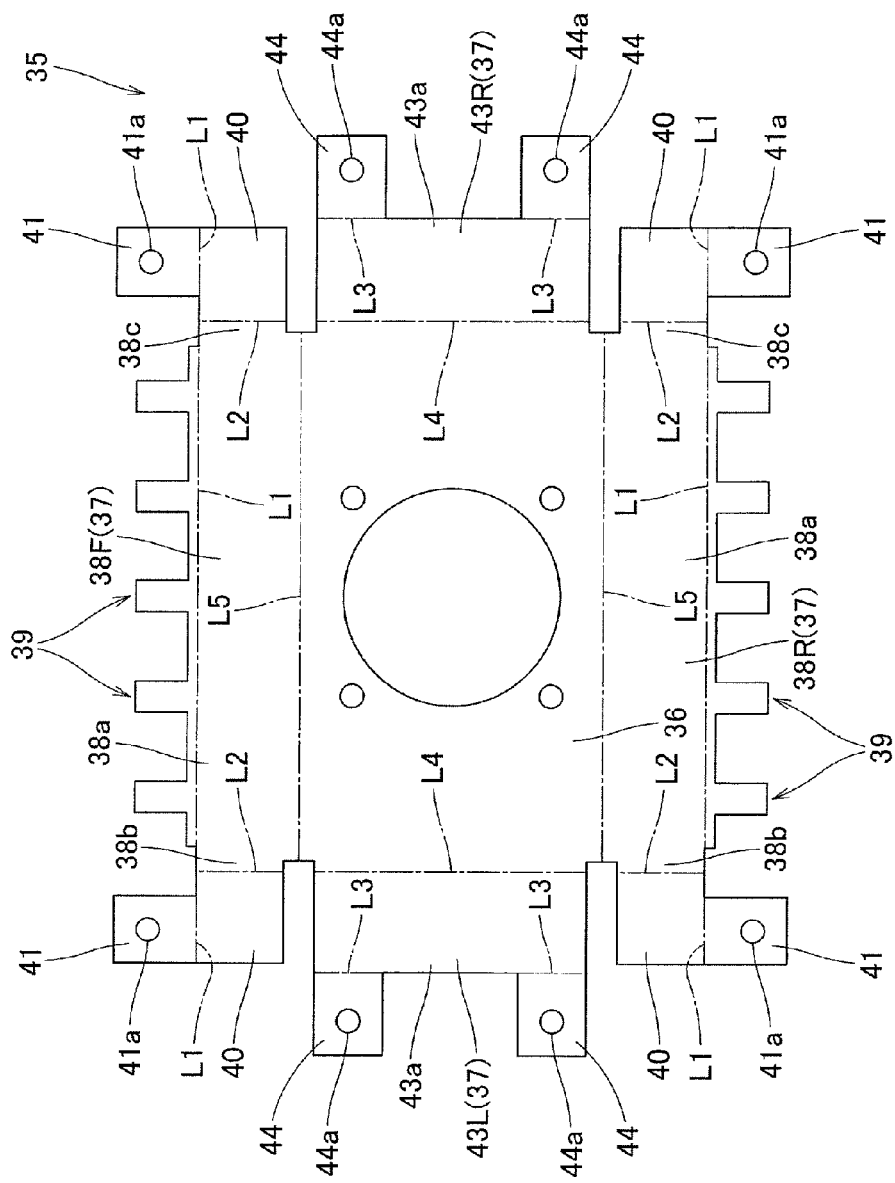
FIG. 4 is a plan view of a case material constituting the case illustrated in FIG. 3.

The case 20 according to this embodiment is formed by punching a sheet metal material to form a case material 35 illustrated in FIG. 4 and bending the case material in the vicinity of fold lines L1 to L5.

As illustrated in FIG. 4, the case material 35 includes a bottom wall component 36 having a substantially rectangular shape constituting the bottom wall portion 21 and four side wall components 37 extending from four sides of the peripheral edge of the bottom wall component 36. The side wall components 37 include the front wall component 38F constituting the front wall portion 24 in the side wall portion 23, the rear wall component 38R constituting the rear wall portion 25, the left wall component 43L constituting the left wall portion 26, and the right wall component 43R constituting the right wall portion 27. In this embodiment, the front wall component 38F and the rear wall component 38R are symmetric in the front-rear direction, and the left wall component 43L and the right wall component 43R are symmetric in the right-left direction.

The front wall component 38F and the rear wall component 38R have a substantially rectangular plate shape in which the width in the right-left direction is substantially matched with the width in the right-left direction of the bottom wall component 36, claw components 39 constituting the locking claw portions 29 are formed to protrude at the edges on the tip sides (upper edges 38a when the case 20 is formed), which are separated from the bottom wall component 36 in the case material 35 unfolded flat, in the front wall component 38F and the rear wall component 38R. In the front wall component 38F and the rear wall component 38R, extension portions 40 extending outward in the case material 35 unfolded flat and extending to the left wall component 43L side and the right wall component 43R side (inward in the front-rear direction) when the case 20 is formed are formed at edges on the left wall component 43L side and the right wall component 43R side (a left edge 38b and a right edge 38c). Each extension portion 40 includes a protruding portion 41 protruding upward from the upper edges 38a of the front wall component 38F and the rear wall component 38R. The protruding portions 41 are superimposed on protruding piece portions 44 formed to protrude from the upper edges 43a side of the left wall component 43L and the right wall component 43R adjacent to each other to constitute the fitting piece portions 30. A through-hole 41a into which the bolt 47 as the fixing member can be inserted is formed in each protruding portion 41. That is, each protruding portion 41 is superimposed on the protruding piece portion 44, is penetrated by the bolt 47 as the fixing member, and is coupled to the fitting piece 11 of the airbag cover 5, thereby constituting the joining piece portion coupled to the protruding piece portion 44.

The left wall component 43L and the right wall component 43R are configured such that the width in the front-rear direction is slightly smaller than the width in the front-rear direction of the bottom wall component 36. In the left wall component 43L and the right wall component 43R, as described above, the protruding piece portions 44 superimposed on the protruding portions 41 are formed to protrude at the front and rear ends of the edge portions of the tips (the upper edges 43a when the case 20 is formed) separated from the bottom wall component 36 in the case material 35 unfolded flat. The protruding piece portions 44 are disposed to be superimposed on the bottom surface of the protruding portions 41 as illustrated in FIGS. 2 and 3 when the case 20 is formed, thereby constituting the fitting piece portions 30. A through-hole 44a which can be penetrated by the bolt 47 as the fixing member is formed in each protruding piece portion 44. In this embodiment, each protruding piece portion 44 is superimposed on the protruding portion 41, is penetrated along with the protruding portion 41 by the bolt 47, and is coupled to the fitting piece 11 of the airbag cover 5 via the protruding portion 41.

Although details thereof are not illustrated, the case 20 according to this embodiment is manufactured as follows. First, in the case material 35, unevenness is applied to the claw components 39 to form the locking claw portions 29, a fold is applied to the fold line L1, the locking claw portions 29 are bent with respect to the front wall component 38F and the rear wall component 38R, and the protruding portions 41 are bent with respect to the extension portions 40. Subsequently, a fold is applied to the fold lines L2, and the extension portions 40 are bent to rise from the front wall component 38F and the rear wall component 38R. Thereafter, a fold is applied to the fold line L3, and the protruding piece portions 44 are bent with respect to the left wall component 43L and the right wall component 43R. Thereafter, a fold is applied to the fold line L4, and the left wall component 43L and the right wall component 43R are bent to rise from the bottom wall component 36. A fold is applied to the fold line L5, and the front wall component 38F and the rear wall component 38R are bent to rise from the bottom wall component 36. At this time, the extension portions 40 are disposed to cover the insides of the left wall component 43L and the right wall component 43R, and the protruding portions 41 of the extension portions 40 are disposed to be superimposed on the protruding piece portions 44 extending from the front end or the rear end of the left wall component 43L and the right wall component 43R adjacent to each other. In this way, the case 20 can be formed.

Thereafter, in a state in which the retainer 14 is received in the case 20, the folded airbag 17 is received to be placed on the bottom wall portion 21, the body portion 12a of the inflator 12 is inserted into the case 20 from the lower side of the bottom wall portion 21, and the bolts 14a of the retainer 14 protruding downward from the bottom wall portion 21 are inserted into the flange portion 12c of the inflator 12. Thereafter, by fastening the nuts 15 to the bolts 14a protruding from the flange portion 12c of the inflator 12, the folded airbag 17 and the inflator 12 can be fitted to the case 20. Subsequently, the locking claw portions 29 are locked to the peripheral edge of the locking hole portions 10a, the bolts 47 as the fixing members are inserted into the through-holes 11a, 41a, and 44a in a state in which the fitting pieces 11 are superimposed on the fitting piece portions 30, and are fixed with the nuts 48 to couple the fitting piece portions 30 (the protruding portions 41 and the protruding piece portions 44) to the fitting pieces 11 of the airbag cover 5 as the coupling member, whereby the airbag cover 5 can be fitted to the case 20 to assemble the airbag device M. In coupling the fitting piece portions 30 to the fitting pieces 11, the case 20 is formed to retain the rising shape of the side wall portion 23 from the bottom wall portion 21.

Thereafter, by fixing the airbag device M to the vehicle body side using a bracket (not illustrated) attached to the case 20 using the bolts 14a of the retainer 14, the airbag device M can be mounted on the vehicle.

After the airbag device M is mounted on the vehicle, when the inflating gas is discharged from the gas discharge ports 12b of the inflator 12 at the time of vehicle front collision, the airbag 17 is inflated by causing the inflating gas to flow therein and the door portions 7 and 7 of the airbag cover 5 are pressed and unfolded. The airbag 17 greatly protrudes from the opening 20a of the case 20 which is formed by pressing and unfolding the door portions 7 and 7 of the airbag cover 5 and completes the inflation.

In the airbag device M according to this embodiment, the protruding portions 41 as the joining piece portions and the protruding piece portions 44 as the joined portions which are formed in the side wall component 37 of the case 20 are coupled to each other using the bolts 47 and the nuts 48 as the fixing members for coupling the case 20 to the fitting pieces 11 of the airbag cover 5 as the surrounding coupling member, and the case 20 retains the rising shape of the side wall portion 23 from the bottom wall portion 21 by coupling the protruding portions 41 and the protruding piece portions 44 using the bolts 47 and the nuts 48. That is, in the airbag device M according to this embodiment, since the rising shape of the side wall portion 23 from the bottom wall portion 21 can be retained and the case 20 is coupled to the airbag cover 5 using the bolts 47 and the nuts 48 for coupling the case 20 to the airbag cover 5, it is possible to simply perform formation of the case and coupling to the coupling member in comparison with the airbag device according to the related art.

Accordingly, in the airbag device M according to this embodiment, it is possible to suppress an increase in manufacturing cost and to simply manufacture the airbag device.

In the airbag device M according to this embodiment, since the airbag cover 5 is used as the coupling member. Accordingly, when the airbag cover 5 is coupled to the case 20 in assembling the airbag device M, it is possible to form the case 20 and to simplify the process of assembling the airbag device M. The coupling member for coupling the joining pieces portions and the joined portions of the case is not limited to the airbag cover, but may employ, for example, a bracket extending from the body side so as to couple the case to the body side.

Figure 5:
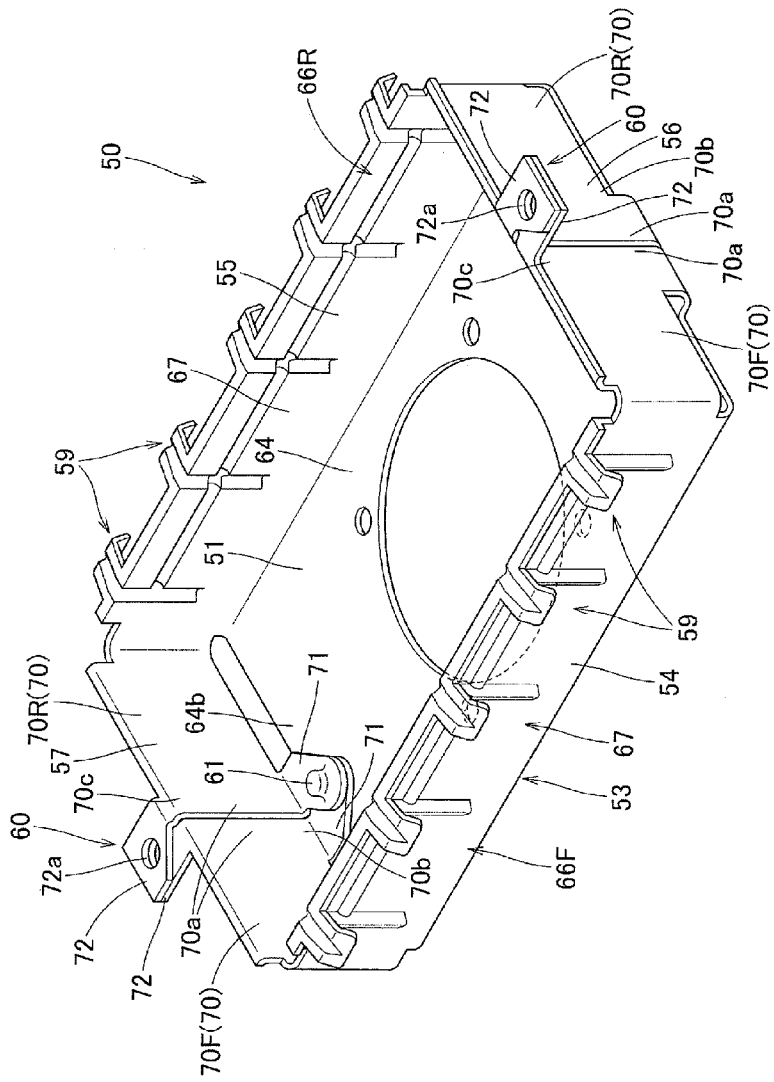
FIG. 5 is a schematic perspective view of a case according to another embodiment of the present invention.

A case 50 according to another embodiment will be described below. As illustrated in FIG. 5, similarly to the case 20, the case 50 includes a bottom wall portion 51 and a side wall portion 53 rising in a substantially tubular shape from the peripheral edge of the bottom wall portion 51 and has a substantially box shape in which the width in the right-left direction is larger, and locking claw portions 59 are formed at the upper ends of the front wall portion 54 and the rear wall portion 55 in the side wall portion 53 similarly to the case 20. In the case 50, fitting piece portions 60 extending outward in the right-left direction are formed to protrude at substantially central positions in the front-rear direction at the upper ends of a left wall portion 56 and a right wall portion 57 in the side wall portion 53. The fitting piece portions 60 are configured by superimposing protruding pieces portions 72 (joining piece portions) extending from side wall components 66F and 66R to be described later in the vertical direction, and are coupled to fitting pieces 11A formed in the airbag cover 5A as the coupling member using the bolts 47 and the nuts 48 as the fixing members in a state in which the fitting pieces 11A are superimposed thereon (see FIG. 8).

Figure 6:
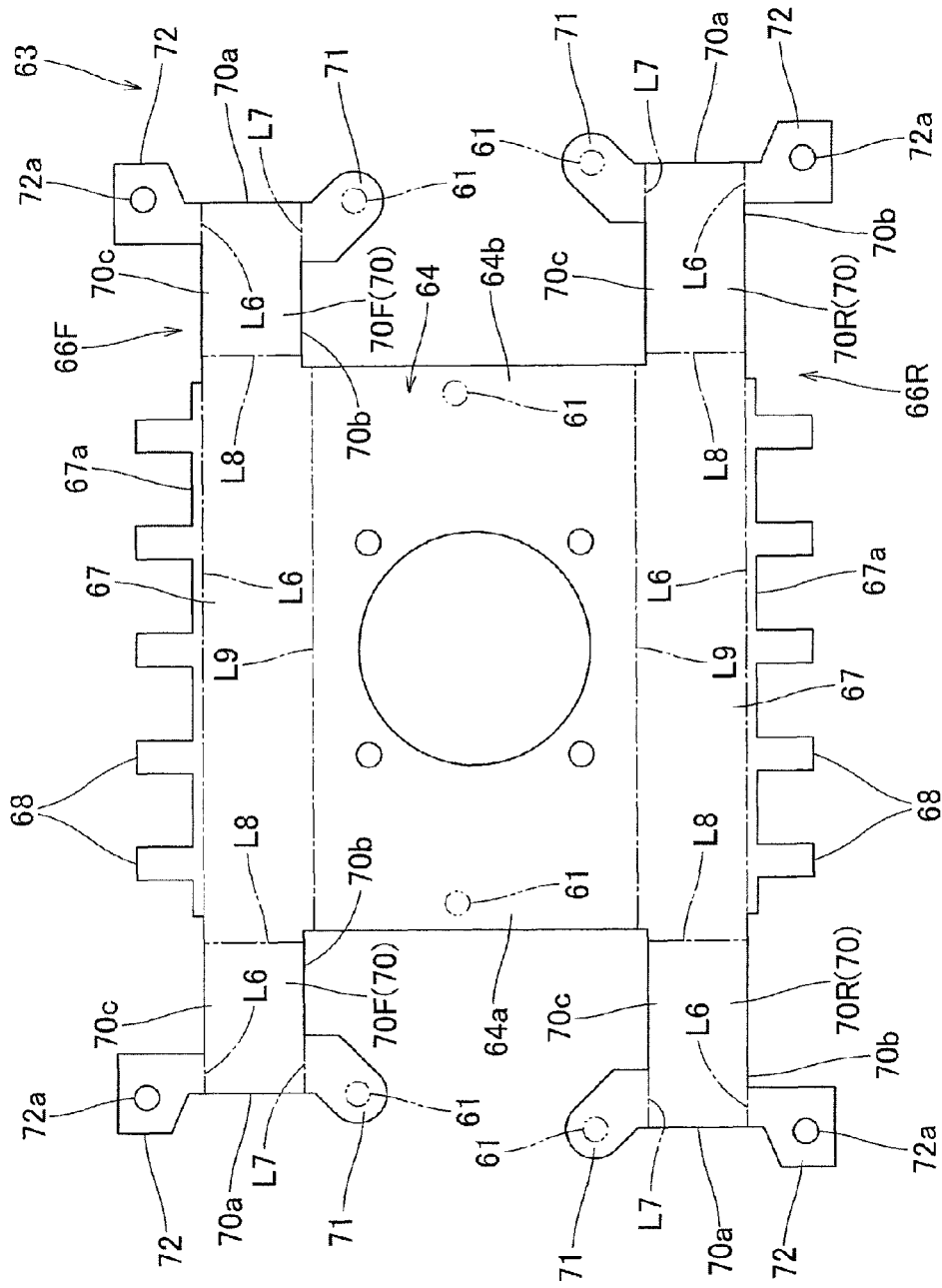
FIG. 6 is a plan view of a case material constituting the case illustrated in FIG. 5.

In the case 50, two side wall components 66F and 66R constituting the side wall portion 53 in a case material 63 include a body portion 67 constituting the front wall portion 54 or the rear wall portion 55 and a partial component 70 extending to protrude outward in the right-left direction from the body portion 67 and constituting a part of the left wall portion 56 or the right wall portion 57 (see FIG. 6). As illustrated in FIG. 5 and Section B of FIG. 7, the side wall portion 53 is formed in a substantially rectangular tubular shape by coupling both coupling piece portions 71 and 71 extending from lower edges 70b on a tip 70a side of the partial components 70 to the bottom wall portion 51 using one caulking portion 61 and coupling protruding piece portions 72 and 72 extending from upper edges 70c on the tip 70a side of the partial components 70 to the fitting pieces 11A of the airbag cover 5A. In the case 50, as will be described later, the left wall portion 56 and the right wall portion 57 in the side wall portion 53 are divided into two parts in the front-rear direction so as to dispose the partial components 70 of two side wall components 66F and 66R in parallel in the front-rear direction (see FIG. 5).

The case 50 is formed by punching a sheet metal material to form a case material 63 illustrated in FIG. 6 and bending the case material 63 in fold lines L6 to L9.

As illustrated in FIG. 6, the case material 63 includes a bottom wall component 64 having a substantially rectangular shape constituting the bottom wall portion 51 and two side wall components 66F and 66R extending from two opposite sides of the peripheral edge of the bottom wall component 64.

The side wall components 66F and 66R constitute the side wall portion 53 and are substantially symmetric in the front-rear direction. In this embodiment, the side wall components 66F and 66R include a body portion 67 formed to extend from a front edge side or a rear edge side facing each other in the front-rear direction in the bottom wall component 64 (the bottom wall portion 51) and partial components 70 (70F and 70R) extending to protrude outward in the right-left direction from both right and left edges of the body portion 67. In this embodiment, in the side wall component 66R constituting the rear part of the side wall portion 53, the width of the partial component 70R is set to be larger than that of the partial component 70F of the side wall component 66F constituting the front part, and the total width in the right-left direction is set to be larger than that in the side wall component 66F (see FIG. 6).

Each body portion 67 constitutes the front wall portion 54 or the rear wall portion 55 in the side wall portion 53 and the width in the right-left direction thereof is substantially matched with the width in the right-left direction of the bottom wall component 64. In the body portions 67, claw components 68 constituting locking claw portions 59 are disposed to protrude at the edge on the tip side (the upper edge 67a when the case 50 is formed) separated from the bottom wall component 64 in the case material 63 unfolded flat.

Each partial component 70 (70F or 70R) constitutes a part of the left wall portion 56 or the right wall portion 57, is formed in the substantially entire area in the vertical direction of the body portion 67 to protrude outward in the right-left direction from the right and left edges of the body portion 67, and the protruding distance (the width in the right-left direction in the case material 63 unfolded flat) from the body portion 67 is set to be about half the width in the front-rear direction of the bottom wall portion 51 (the bottom wall component 64). Specifically, as described above, the width in the right-left direction of the front partial component 70F is set to be smaller than the width in the right-left direction of the rear partial component 70R, and the widths in the right-left direction (the widths in the front-rear direction when the case 50 is formed) of the partial components 70F and 70R are set to dimensions with which a clearance is hardly formed between the partial components 70F and 70R when the tips 70a come in contact with each other and the left wall portion 56 and the right wall portion 57 are constituted by the partial components 70F and 70R. In this embodiment, the partial components 70F and 70R constitute areas of about a front half and a rear half in the left wall portion 56 and the right wall portion 57.

On the lower edge 70b side of on the tip 70a side of each partial component 70, as illustrated in FIG. 6, a coupling piece portion 71 joined to a part on a left edge 64a or a right edge 64b of the bottom wall component 64 is formed to protrude downward to the tip side (the center side in the front-rear direction when the case 50 is formed). The coupling piece portions 71 are arranged to be vertically superimposed on the bottom wall component 64 when the case 50 is formed, and the two coupling piece portions 71 and 71 and the bottom wall component 64 are caulked at one position and are coupled to the bottom wall portion 51 (see Section B of FIG. 7).

On the upper edge 7c side on the tip 70a side of each partial component 70, as illustrated in FIG. 6, protruding piece portion 72 constituting the fitting piece portion 60 is formed to protrude upward to the tip side (the center side in the front-rear direction when the case 50 is formed). The protruding piece portions 72 and 72 are arranged to be vertically superimposed when the case 50 is formed, and each includes a through-hole 72a which can be penetrated by the bolt 47 as the fixing member. The protruding pieces 72 are superimposed on each other, are penetrated by the bolt 47 as the fixing member, and are coupled to the fitting piece 11A of the airbag cover 5A, thereby constituting the joining piece portions which are mutually coupled.

Although details thereof are not illustrated, the case 50 is manufactured as follows. First, in the case material 63, unevenness is applied to the claw components 68 to form the locking claw portions 59, a fold is applied to the fold line L6, the locking claw portions 59 are bent with respect to the body portion 67, and the protruding piece portions 72 are bent with respect to the partial component 70. Subsequently, a fold is applied to the fold lines L7, and the coupling piece portions 71 are bent with respect to the partial component 70. Thereafter, a fold is applied to the fold line L8 and the partial components 70 are bent to rise from the body portions 67. Subsequently, a fold is applied to the fold line L9 and the side wall components 66F and 66R are bent to rise from the bottom wall component 64. At this time, the coupling piece portions 71 are disposed to be vertically superimposed on each other above the vicinity of the left edge 64a and the right edge 64b of the bottom wall component 64 (see Section A of FIG. 7). Then, as illustrated in B of FIG. 8, the coupling piece portions 71 and 71 superimposed mutually and the parts of the bottom wall component 64 on the left edge 64a side or the right edge 64b side are partially caulked by Tox caulking in the direction (vertical direction) perpendicular to the bottom wall portion 51 to form a caulking portion 61, and the parts of the side wall components 66F and 66R on the lower edge side are coupled to the bottom wall portion 51 (see Section B of FIG. 7). Thereafter, similarly to the case 20, when an airbag (not illustrated) and an inflator are received therein and the case is coupled to the airbag cover 5A, the fitting piece portions 60 (the protruding piece portions 72 and 72) are coupled to the fitting pieces 11A of the airbag cover 5A as the coupling member by inserting the bolts 47 as the fixing members into the through-holes 11a and 72a and fixing the bolts with the nuts 48 in a state in which the fitting pieces 11A are superimposed on the fitting piece portions 60 as illustrated in FIG. 8. Then, the airbag cover 5A can be fitted to the case 50 and the case 50 is formed to retain the rising shape of the side wall portion 53 from the bottom wall portion 51 at the same time.

When the case 50 having the above-mentioned configuration is used, the protruding piece portions 72 and 72 as the joining piece portions which are formed in the side wall components 66F and 66R of the case 50 are coupled to each other using the bolts 47 and the nuts 48 as the fixing members for coupling the case 50 to the fitting pieces 11A of the airbag cover 5A as the surrounding coupling member, and the case 50 retains the rising shape of the side wall portion 53 from the bottom wall portion 51 by coupling the protruding piece portions 72 and 72 using the bolts 47 and the nuts 48. That is, in the airbag device using the case 50 having the above-mentioned configuration, since the rising shape of the side wall portion 53 from the bottom wall portion 51 can be retained and the case 50 is coupled to the airbag cover 5A using the bolts 47 and the nuts 48 for coupling the case 50 to the airbag cover 5A, it is possible to simply perform formation of the case and coupling to the coupling member in comparison with the airbag device according to the related art.

Figure 7:
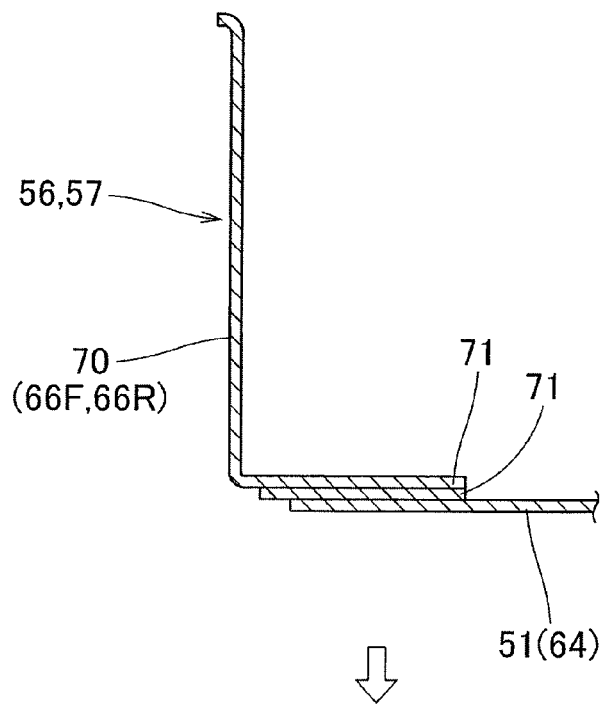
FIG. 7 is a partially-enlarged longitudinal cross-sectional view schematically illustrating formation of a caulking portion in a process of manufacturing the case illustrated in FIG. 5.
Figure 7:
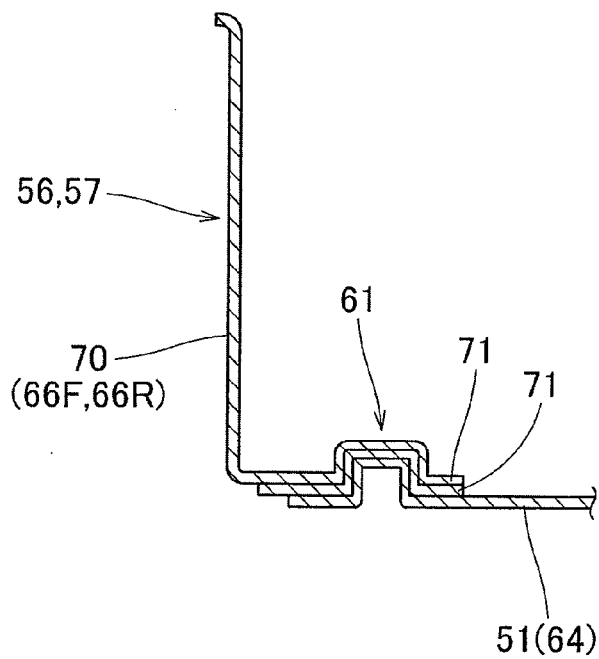
Figure 8:
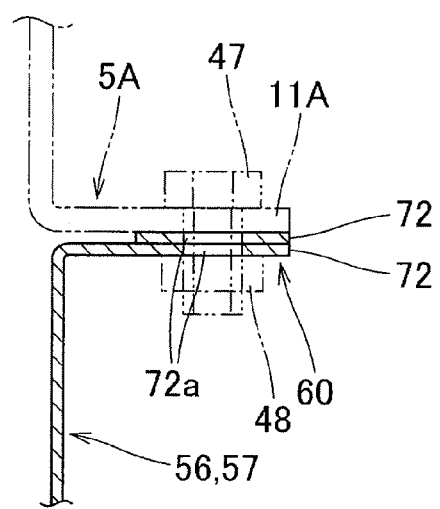
FIG. 8 is an enlarged cross-sectional view illustrating a part of a fitting piece portion in the case illustrated in FIG. 5.

In the case 50, the lower edge sides of the side wall components 66F and 66R are coupled to the bottom wall portion 51 by coupling the coupling piece portions 71 and 71 extending from the side wall components 66F and 66R to the bottom wall portion 51 by caulking, but since the caulking direction at the time of formation of the caulking portion 61 is perpendicular to the bottom wall portion 51 and is parallel to the direction in which the bending is performed on the side wall components 66F and 66R to rise from the bottom wall component 64 at the time of formation of the case 50 as illustrated in A and Section B of FIG. 7, the caulking process can be performed in the same step as the bending process. In other words, the case 50 can be sequentially manufactured in a state in which a mold clamping direction of a press mold is set to the same direction without departing from a machining line in which a workpiece is machined with a deflection in a direction perpendicular to the mold clamping direction. Accordingly, an increase in the number of manufacturing steps is not caused.

Figure 9:
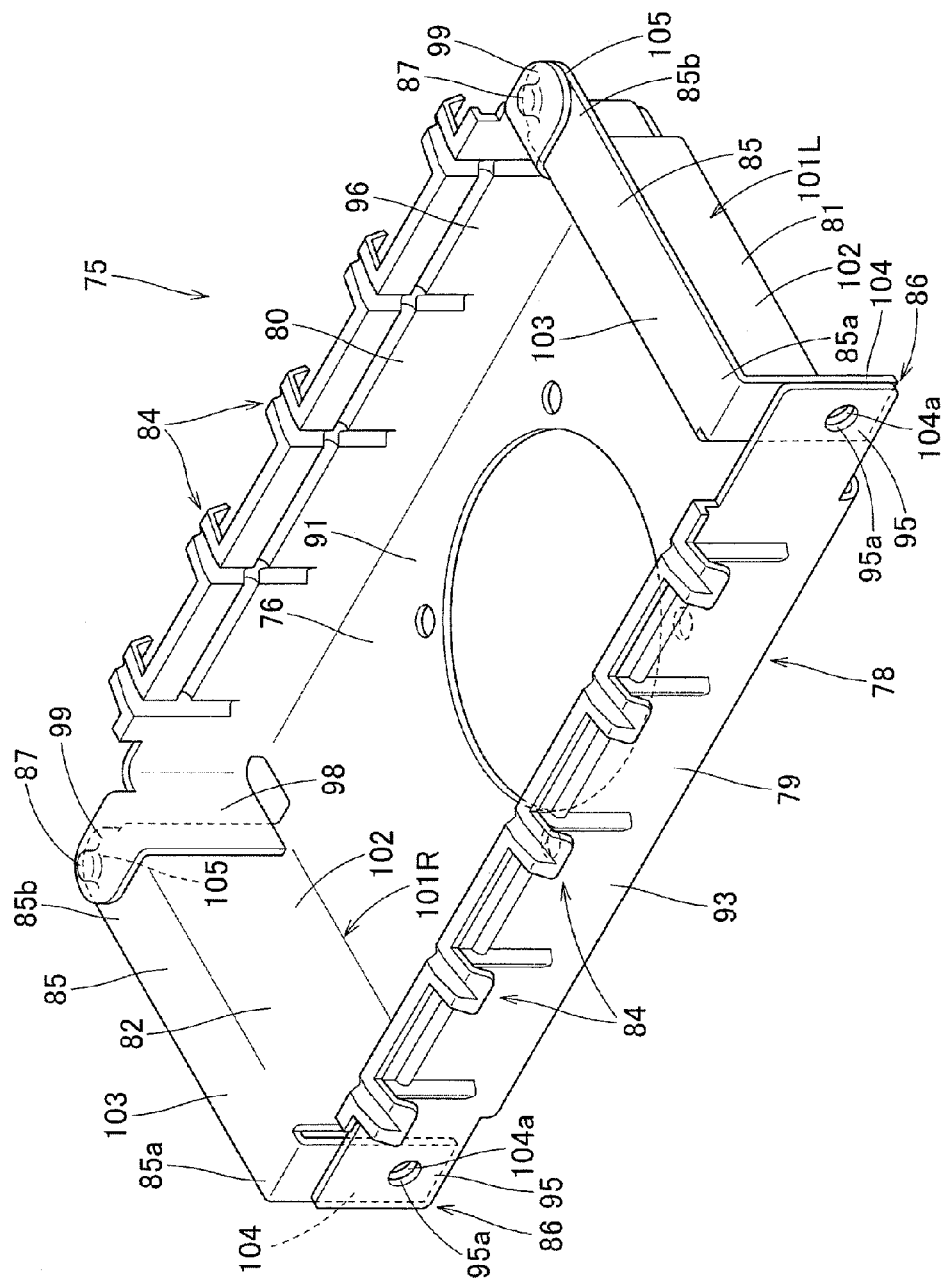
FIG. 9 is a schematic perspective view of a case according to still another embodiment of the present invention.

In the case 20, the rising shape of the side wall portion 23 from the bottom wall portion 21 is retained by disposing the fitting piece portions 30 formed by superimposing the protruding portions 41 and the protruding piece portions 44 at four corners of the side wall portion 23 and coupling the four fitting piece portions 30 to the fitting pieces 11 of the airbag cover 5, but the rising shape of a side wall portion 78 from a bottom wall portion 76 may be retained by performing a partial caulking process as in a case 75 illustrated in FIG. 9.

Figure 11:
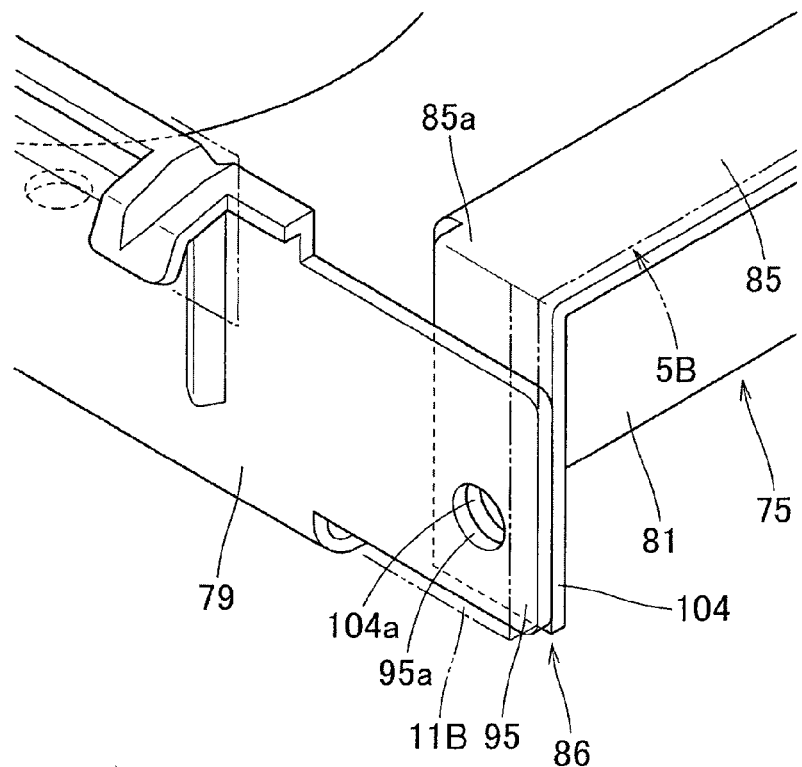
FIG. 11 is a partially-enlarged perspective view illustrating a part of a fitting piece portion in the case illustrated in FIG. 9.

As illustrated in FIG. 9, similarly to the cases 20 and 50, the case 75 includes a bottom wall portion 76 and a side wall portion 78 rising in a substantially tubular shape from the peripheral edge of the bottom wall portion 76 and has a substantially box shape in which the width in the right-left direction is larger, and locking claw portions 84 are formed at the upper ends of a front wall portion 79 and a rear wall portion 80 in the side wall portion 78 similarly to the cases 20 and 50. In the case 75, flange portions 85 extending outward in the right-left direction substantially along the bottom wall portion 76 are formed in the entire area in the front-rear direction at the upper ends of a left wall portion 81 and a right wall portion 82 in the side wall portion 78. The flange portions 85 are bent downward to the front end so as to extend to the right and left parts of the front wall portion 79. The part on the front end side of each flange portion 85 constitutes a fitting piece portion 86 to be coupled to a fitting piece 11B formed in an airbag cover 5B as the coupling member. The fitting piece portion 86 is formed by superimposing the part on the front end side (a front-end portion 104 of a flange component 103 to be described later, a joined portion) of the flange portion 85 and a protruding piece portion 95 (joining piece portion) extending outward from a left edge 93b or a right edge 93c of a front wall component 93 in the front-rear direction, and is coupled to the fitting piece 11B formed in the airbag cover 5B as the coupling member using a bolt 47 and a nut 48 as the fixing members in a state in which the fitting piece portion is superimposed on the fitting piece 11B from the front side (see FIGS. 11 and 12). A through-hole 104a which can be penetrated by the bolt 47 as the fixing member is formed in the front-end portion 104 of the flange component 103. A through-hole 95a which can be penetrated by the bolt 47 is also formed in the protruding piece portion 95.

On a rear end 85b side of the flange portion 85, a caulking portion 87 coupling a part of the rear end 85b side of the flange portion 85 and a protruding portion 99 of an extension portion 98 extending from the rear wall component 96 is formed. In the case 75, protruding piece portions 95 extending from a front wall component 93 constituting a front wall portion 79 constitutes the fitting piece portions 86 along with the front-end portions 104 formed on the front end side of the flange portions 85 of the left wall portion 81 and the right wall portion 82, and the front wall portion 79 is coupled to the left wall portion 81 and the right wall portion 82 by superimposing the protruding piece portions 95 on the front-end portions 104 and coupling the fitting piece portions 86 to the fitting pieces 11B of the airbag cover 5B in fitting the airbag cover 5B to the case 75. The rear wall component 96 constituting the rear wall portion 80 and the left wall component 101L and the right wall component 101R constituting the left wall portion 81 and the right wall portion 82 are coupled to each other by the caulking portions 87 formed on the rear end 85b side of the flange portions 85, and the rear wall portion 80 is coupled to the left wall portion 81 and the right wall portion 82. In the case 75, the side wall portion 78 is formed in a substantially rectangular tubular shape to retain the rising shape of the side wall portion 78 from the bottom wall portion 76 using the fitting piece portions 86 disposed on the front end side of the side wall portion 78 and the caulking portions 87 disposed on the rear end side.

Figure 10:
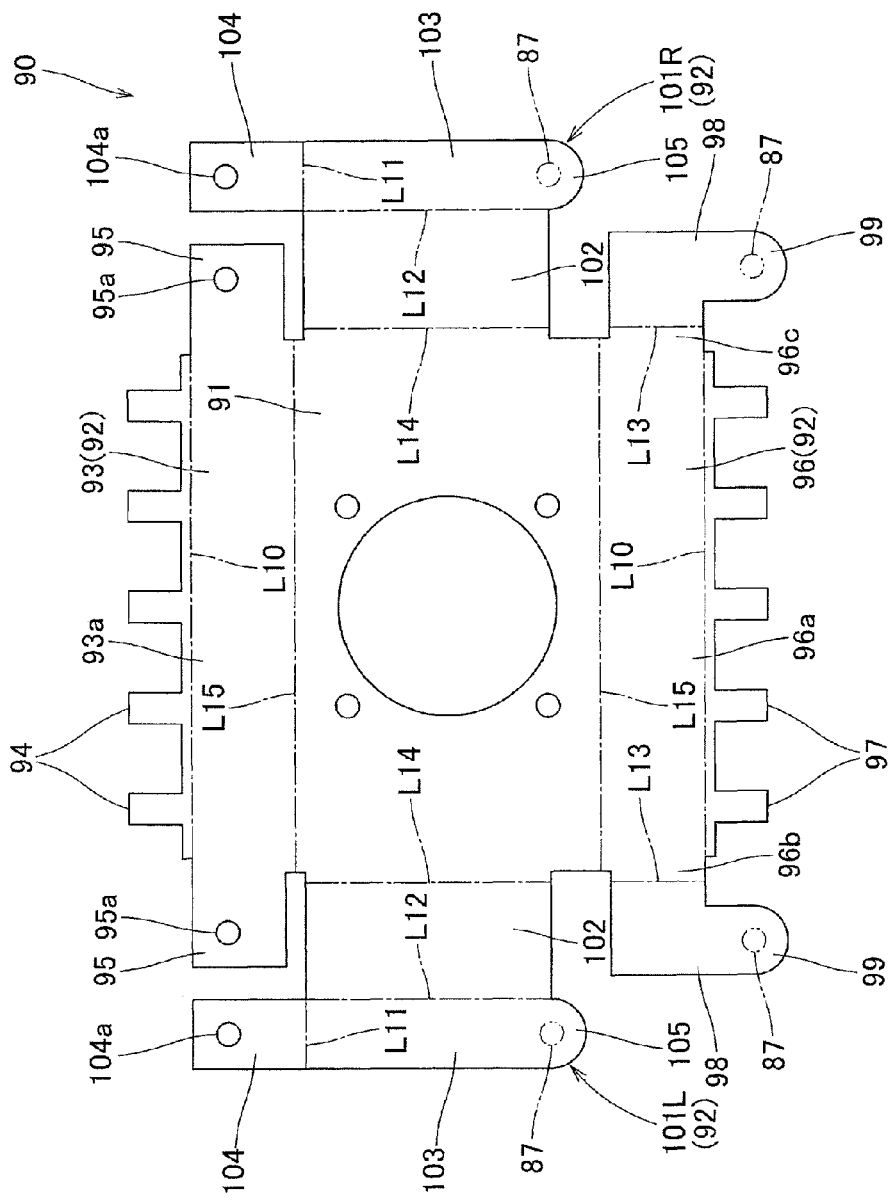
FIG. 10 is a plan view of a case material constituting the case illustrated in FIG. 9.

The case 75 is formed by punching a sheet metal material to form a case material 90 illustrated in FIG. 10 and bending the case material 90 in fold lines L10 to L15.

As illustrated in FIG. 10, the case material 90 includes a bottom wall component 91 having a substantially rectangular shape constituting the bottom wall portion 76 and four side wall components 92 extending from four sides of the peripheral edge of the bottom wall component 91. The side wall components 92 include the front wall component 93 constituting the front wall portion 79 in the side wall portion 78, the rear wall component 96 constituting the rear wall portion 80, the left wall component 101L constituting the left wall portion 81, and the right wall component 101R constituting the right wall portion 82. The left wall component 101L and the right wall component 101R are symmetric in the right-left direction.

The front wall component 93 has a substantially rectangular plate shape in which the width in the right-left direction is substantially matched with the width in the right-left direction of the bottom wall component 91, and claw components 94 constituting the locking claw portions 84 are formed to protrude at the edge on the tip side (the upper edge 93a when the case is formed) separated from the bottom wall component 91 in the case material 90 unfolded flat. Protruding piece portions 95 are formed to extend outward in the right-left direction at the upper ends on a left edge 93b side and a right edge 93c side of the front wall component 93. The protruding piece portions 95 constitute the fitting piece portions 86 when the case 75 is formed, and thus are disposed to be superimposed on the front-end portion 104 of the flange component 103 disposed bent on the front end side of the flange portion 85 in the front-rear direction The rear wall component 96 has a substantially rectangular shape in which the width in the right-left direction is substantially matched with the width in the right-left direction of the bottom wall component 91, and claw components 97 constituting the locking claw portions 84 are formed to protrude in a part on the tip side (the upper edge 96a when the case 75 is formed) separated from the bottom wall component 91 in the case material 90 unfolded flat. Extension portions 98 extending outward in the case material 90 unfolded flat and extending to the left wall component 101L and the right wall component 101R (inward in the right-left direction) when the case 75 is formed are formed at the left edge 96b and the right edge 96c of the rear wall component 96. Each extension portion 98 is formed in the substantially entire area in the vertical direction of the rear wall component 96 (the side wall portion 78) and includes a protruding portion 99 protruding upward from the upper edge 96a of the rear wall component 96. The protruding portion 99 is superimposed on the rear-end portion 105 of the flange component 103 in each of the left wall component 101L and the right wall component 101R when the case 75 is formed, and a caulking portion 87 is formed in a part of the protruding portion 99.

Each of the left wall component 101L and the right wall component 101R includes a body portion 102 constituting the left wall portion 81 or the right wall portion 82 and having a substantially rectangular shape and a flange component 103 extending from the upper edge of the body portion 102 to constitute the flange portion 85. In this embodiment, the body portion 102 is configured such that the width in the front-rear direction is slightly smaller than the width in the front-rear direction of the bottom wall component 91. The flange component 103 is formed in the entire area in the front-rear direction of the body portion 102 and is disposed such that the front-end portion thereof protrudes forward from the body portion 102. The front-end portion 104 of the flange component 103 is bent to protrude downward from the flange portion 85 to constitute the fitting piece portion 86 when the case 75 is formed. The rear-end portion 105 which is a rear end of the flange component 103 is coupled to the protruding portion 99 formed in the extension portion 98 of the rear wall component 96 by the caulking portion 87 when the case 75 is formed.

Figure 12:
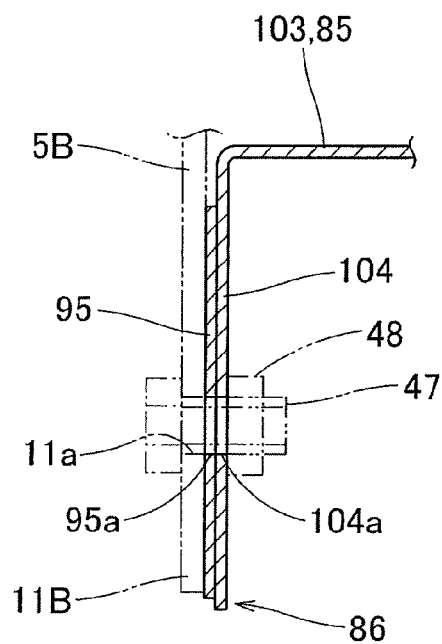
FIG. 12 is a partially-enlarged cross-sectional view illustrating a part of a fitting piece portion in the case illustrated in FIG. 9.

Although details thereof are not illustrated, the case 75 is manufactured as follows. First, in the case material 90, unevenness is applied to the claw components 94 and 97 to form the locking claw portions 84, a fold is applied to the fold line L10, the locking claw portions 84 are bent with respect to the front wall component 93 and the rear wall component 96. At the same time, a fold is applied to the fold line L11, and the front-end portion 104 is bent with respect to the flange component 103. Subsequently, a fold is applied to the fold line L12 and the flange component 103 is bent with respect to the body portion 102. Thereafter, a fold is applied to the fold line L13 and the extension portions 98 are bent with respect to the rear wall component 96. Subsequently, a fold is applied to the fold line L14 and the left wall component 101L and the right wall component 101R are bent to rise from the bottom wall component 91. Thereafter, a fold is applied to the fold line L15 and the front wall component 93 and the rear wall component 96 are bent to rise from the bottom wall component 91. At this time, the extension portions 98 are disposed to cover the insides of the left wall component 101L and the right wall component 101R. The protruding portions 99 of the extension portions 98 are disposed to be vertically superimposed on the rear-end portions 105 of the flange components 103, and the protruding portions 99 and the flange portions 85 (the flange components 103) are disposed to be substantially parallel to the bottom wall portion 76 (see Section A of FIG. 13). The protruding piece portions 95 formed in the front wall component 93 are disposed to be superimposed on the front-end portions 104 in the front-rear direction on the front side of the front-end portions 104 of the flange components 103. Then, as illustrated in Section B of FIG. 13, the protruding portions 99 and the rear-end portions 105 of the flange components 103 superimposed mutually are partially caulked by Tox caulking in the direction (vertical direction) substantially perpendicular to the bottom wall portion 76 to form the caulking portions 87 and to couple the rear wall portion 80 to the left wall portion 81 and the right wall portion 82. Thereafter, similarly to the case 20, when an airbag (not illustrated) and an inflator are received therein and the case is coupled to the airbag cover 5B, the fitting piece portions 86 (the protruding portions 99 and the front-end portions 104) are coupled to the fitting pieces 11B of the airbag cover 5B as the coupling member by inserting the bolts 47 as the fixing members into the through-holes 11a, 95a, and 104a and fixing the bolts with the nuts 48 in a state in which the fitting pieces 11B are superimposed on the front side of the fitting piece portions 86 as illustrated in FIG. 12. Then, the airbag cover 5B can be fitted to the case 75 and the case 75 is formed to retain the rising shape of the side wall portion 78 from the bottom wall portion 76 at the same time.

When the case 75 having the above-mentioned configuration is used, the protruding portions 99 as the joining piece portions which are formed in the side wall components 92 of the case 75 and the front-end portions 104 as the joined portions are coupled to each other using the bolts 47 and the nuts 48 as the fixing members for coupling the case 75 to the fitting pieces 11B of the airbag cover 5B as the surrounding coupling member, and the case 75 retains the rising shape of the side wall portion 78 from the bottom wall portion 76 by coupling the protruding portions 99 and the front-end portions 104 using the bolts 47 and the nuts 48. That is, in the airbag device using the case 75 having the above-mentioned configuration, since the rising shape of the side wall portion 78 from the bottom wall portion 76 can be retained and the case 75 can be coupled to the airbag cover 5B using the bolts 47 and the nuts 48 for coupling the case 75 to the airbag cover 5B, it is possible to simply perform formation of the case and coupling to the coupling member in comparison with the airbag device according to the related art.

Figure 13:
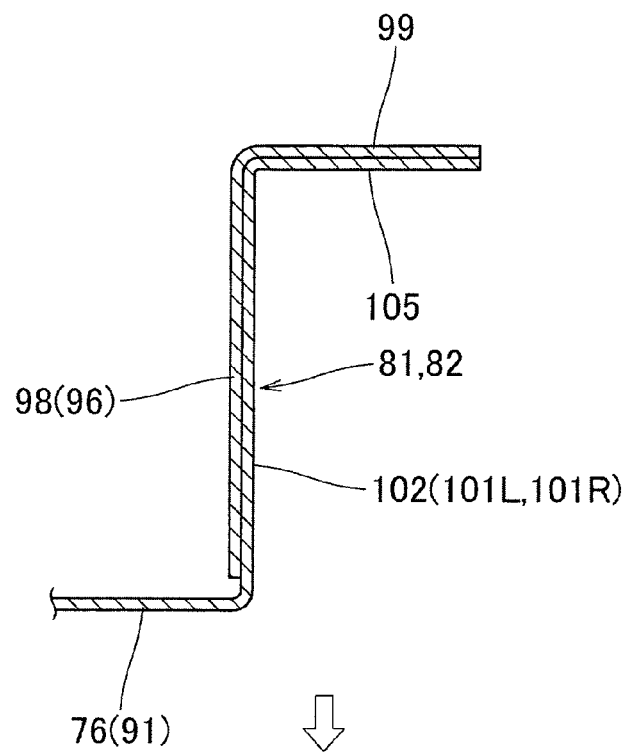
FIG. 13 is a partially-enlarged longitudinal cross-sectional view schematically illustrating formation of a caulking portion in a process of manufacturing the case illustrated in FIG. 9.
Figure 13:
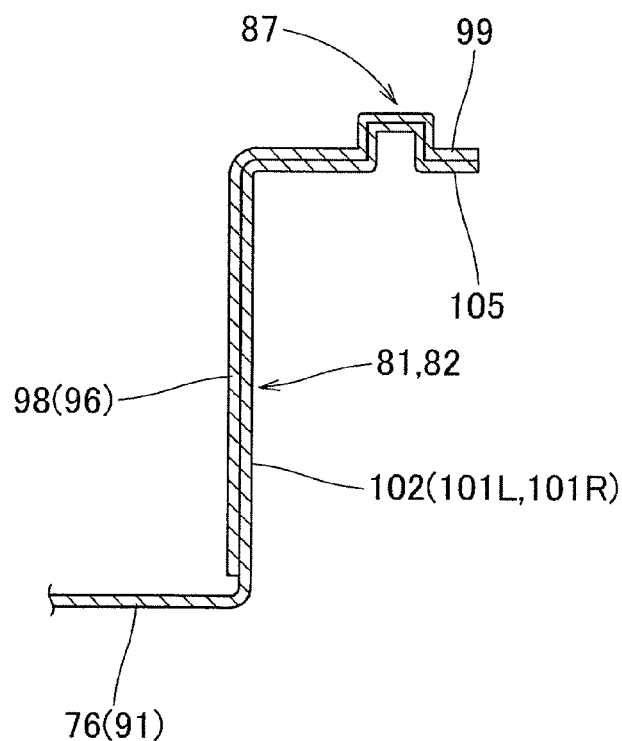

In the case 75, the front wall portion 79 is coupled to the left wall portion 81 and the right wall portion 82 by coupling the fitting piece portions 86 to the fitting pieces 11B and the rear wall portion 80 is coupled to the left wall portion 81 and the right wall portion 82 by caulking the protruding portions 99 extending from the rear wall portion 80 to the flange portions 85 extending from the left wall portion 81 and the right wall portion 82, but since the caulking direction is perpendicular to the bottom wall portion 76 and parallel to the direction in which the bending is performed on the side wall components 92 to rise from the bottom wall component 91 at the time of formation of the case 75 as illustrated in Sections A and B of FIG. 13, the caulking process can be performed in the same step as the bending process. Accordingly, an increase in the number of manufacturing steps is not caused.

In the above-mentioned embodiments, the airbag device for a front passenger seat has been exemplified as the airbag device, but the present invention is not limited to the airbag device for a front passenger seat and can be applied to an airbag device for a steering wheel, a knee-protecting airbag device, or the like.

What is claimed is:

1. An airbag device comprising:
a case configured to receive an airbag that is folded, and configured to enable the airbag under inflation to protrude from an upper opening, the case having a substantially box shape, and including a bottom wall portion and a side wall portion that rises in a substantially tubular shape from a peripheral edge of the bottom wall portion;
a fixing member; and
a coupling member surrounding the case and coupled to the case by the fixing member, wherein:
the case is formed to retain a rising shape of the side wall portion from the bottom wall portion by
performing a bending process on a sheet metal material such that side wall components constituting the side wall portion rise from a peripheral edge of a bottom wall component constituting the bottom wall portion in the sheet metal material, and
superimposing and coupling a joining piece portion formed in a front or rear wall component on and to a corresponding joined portion formed in one of the side wall components; and
the joining piece portion in the case and the joined portion corresponding to the joining piece portion include through-holes which are penetrated by the fixing member, respectively, and are coupled to each other and are coupled to the coupling member using the fixing member penetrating the through-holes of the joining piece portion and the joined portion in a state in which the joining piece portion and the joined portion are superimposed on each other.

2. The airbag device according to claim 1, wherein the coupling member is an airbag cover including a door portion that covers the opening and is pressed and unfolded by the airbag in unfolding the folded airbag.

* * * * *